(12) United States Patent
Diab et al.

(10) Patent No.: US 8,588,254 B2
(45) Date of Patent: Nov. 19, 2013

(54) METHOD AND SYSTEM FOR ENERGY EFFICIENT SIGNALING FOR 100MBPS ETHERNET USING A SUBSET TECHNIQUE

(75) Inventors: Wael William Diab, San Francisco, CA (US); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 172 days.

(21) Appl. No.: 12/243,512

(22) Filed: Oct. 1, 2008

(65) Prior Publication Data
US 2009/0154500 A1 Jun. 18, 2009

Related U.S. Application Data

(60) Provisional application No. 61/014,323, filed on Dec. 17, 2007.

(51) Int. Cl.
*H04J 3/18* (2006.01)
*G01R 31/08* (2006.01)
*H04L 12/28* (2006.01)
*H04L 12/413* (2006.01)

(52) U.S. Cl.
USPC ............ 370/477; 370/235; 370/254; 370/445

(58) Field of Classification Search
USPC .................................. 370/477, 235, 254, 445
See application file for complete search history.

(56) References Cited

U.S. PATENT DOCUMENTS

| 5,381,450 | A | | 1/1995 | Lane |
| 5,640,605 | A | * | 6/1997 | Johnson et al. ................. 710/61 |
| 6,085,248 | A | | 7/2000 | Sambamurthy et al. |
| 6,442,174 | B1 | | 8/2002 | Lin |

(Continued)

FOREIGN PATENT DOCUMENTS

| EP | 1 473 870 | 11/2004 |
| EP | 1484876 | 12/2004 |

(Continued)

OTHER PUBLICATIONS

Bennett et al., "Energy Efficient Ethernet", [Online] IEEE 802 Tutorial, Jul. 16, 2007, http://www.ieee802.org/802_tutorials/july07/IEEE-tutorial-energy-efficient-ethernet.pdf.

(Continued)

*Primary Examiner* — Mark Rinehart
*Assistant Examiner* — Angel Brockman
(74) *Attorney, Agent, or Firm* — Duane S. Kobayashi

(57) ABSTRACT

Aspects of a method and system for energy efficient signaling for 100 mbps Ethernet using a subset are provided. In this regard, a network device enabled to communicate over a network link at 1 Gbps or faster may be configured to communicate over the network link at, or approximately at, 100 Mbps by reducing a number of active channels over which the network device communicates and/or reducing a size of a signal constellation utilized by the network device to encode data. The device may communicate according to 1GBASE-T or 10GBASE-T standards. The number of active channels may be reduced to a single bidirectional channel or two unidirectional channels. The signal constellation may be reduced to two or three levels. One or more components of the network device may be unnecessary for recovering data when communicating at 100 Mbps and may thus be powered down, or placed into a lower power mode.

21 Claims, 9 Drawing Sheets

(56) References Cited

U.S. PATENT DOCUMENTS

| | | | |
|---|---|---|---|
| 6,483,870 B1 | 11/2002 | Locklear, Jr. et al. | |
| 6,538,994 B1 | 3/2003 | Horspool | |
| 6,587,473 B2 | 7/2003 | Terry et al. | |
| 6,724,829 B1 | 4/2004 | Tzuckerman | |
| 6,731,692 B1 | 5/2004 | Bhoja | |
| 6,763,097 B1 | 7/2004 | Vitenberg | |
| 6,795,450 B1 | 9/2004 | Mills et al. | |
| 6,853,637 B1 | 2/2005 | Norrell et al. | |
| 6,856,597 B1 | 2/2005 | Scott | |
| 6,952,399 B1 | 10/2005 | Bayerl | |
| 7,003,331 B2 | 2/2006 | Cromer | |
| 7,116,682 B1 | 10/2006 | Waclawsky | |
| 7,149,397 B2* | 12/2006 | Popovic et al. | 385/134 |
| 7,308,058 B2* | 12/2007 | Zerbe et al. | 375/353 |
| 7,315,967 B2 | 1/2008 | Azenko | |
| 7,492,710 B2 | 2/2009 | Wadekar et al. | |
| 7,719,966 B2 | 5/2010 | Luft et al. | |
| 7,916,676 B2* | 3/2011 | Elzur et al. | 370/311 |
| 2001/0009553 A1* | 7/2001 | Homann | 370/445 |
| 2001/0033611 A1 | 10/2001 | Grimwood | |
| 2002/0136231 A1 | 9/2002 | Leatherbury | |
| 2002/0172274 A1 | 11/2002 | Carlson | |
| 2003/0053493 A1 | 3/2003 | Graham Mobley | |
| 2003/0191854 A1 | 10/2003 | Hsu | |
| 2004/0006769 A1 | 1/2004 | Ansari et al. | |
| 2004/0008794 A1* | 1/2004 | McClellan | 375/260 |
| 2004/0013126 A1* | 1/2004 | Yun | 370/433 |
| 2004/0088590 A1* | 5/2004 | Lee et al. | 713/300 |
| 2004/0184810 A1* | 9/2004 | Spilman et al. | 398/139 |
| 2004/0223462 A1* | 11/2004 | Cromer et al. | 370/252 |
| 2004/0258085 A1* | 12/2004 | Costo | 370/445 |
| 2006/0034295 A1 | 2/2006 | Cherukuri et al. | |
| 2006/0034334 A1* | 2/2006 | Biederman | 370/477 |
| 2006/0109784 A1 | 5/2006 | Weller et al. | |
| 2006/0140218 A1 | 6/2006 | Winterton | |
| 2007/0127581 A1 | 6/2007 | Connor | |
| 2007/0192505 A1* | 8/2007 | Dalmia | 709/233 |
| 2007/0280239 A1 | 12/2007 | Lund | |
| 2008/0056284 A1 | 3/2008 | Powell et al. | |
| 2008/0069014 A1 | 3/2008 | Powell et al. | |
| 2008/0201626 A1 | 8/2008 | Sturm | |
| 2008/0219289 A1* | 9/2008 | Harrison et al. | 370/465 |
| 2008/0225841 A1* | 9/2008 | Conway et al. | 370/389 |
| 2008/0311865 A1 | 12/2008 | Worfolk et al. | |
| 2008/0313508 A1 | 12/2008 | Starr | |
| 2009/0028050 A1 | 1/2009 | Winter | |
| 2009/0097427 A1 | 4/2009 | Diab | |
| 2009/0097442 A1 | 4/2009 | Diab | |
| 2009/0097481 A1 | 4/2009 | Diab | |
| 2009/0097500 A1 | 4/2009 | Diab | |
| 2009/0154355 A1 | 6/2009 | Diab | |
| 2009/0154455 A1 | 6/2009 | Diab | |
| 2009/0154490 A1 | 6/2009 | Diab | |
| 2009/0154500 A1 | 6/2009 | Diab | |
| 2009/0154593 A1 | 6/2009 | Diab | |
| 2009/0180529 A1* | 7/2009 | Agazzi et al. | 375/233 |
| 2009/0225773 A1 | 9/2009 | Winter | |

FOREIGN PATENT DOCUMENTS

| | | |
|---|---|---|
| EP | 1 494 407 | 1/2005 |
| GB | 2337672 | 11/1999 |
| WO | WO 00/31923 | 6/2000 |

OTHER PUBLICATIONS

Grow, "802.1 and Energy Efficient Ethernet", [Online] Sep. 11, 2007, pp. 1-6, http://www.ieee802.org/3/eee_study/public/sep07/grow_1_0907.pdf.

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.

Gupta et al., "Dynamic Ethernet Link Shutdown for Energy Conservation on Ethernet Links." IEEE, Jun. 24, 2007. XP002524616.

Wael Diab, "Energy Efficient Ethernet and 802.1." Nov. 2007. XP002524617.

* cited by examiner

METHOD AND SYSTEM FOR ENERGY EFFICIENT SIGNALING FOR 100MBPS ETHERNET USING A SUBSET TECHNIQUE

CROSS-REFERENCE TO RELATED APPLICATIONS/INCORPORATION BY REFERENCE

This patent application makes reference to, claims priority to and claims benefit from U.S. Provisional Patent Application Ser. No. 61/014,323 filed on Dec. 17, 2007.

FIELD OF THE INVENTION

Certain embodiments of the invention relate to networking. More specifically, certain embodiments of the invention relate to a method and system for energy efficient signaling for 100 mbps Ethernet using a subset technique.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for energy efficient signaling for 100 mbps Ethernet using a subset technique, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for energy efficient signaling for 100 mbps Ethernet using a subset technique. In various exemplary embodiments of the invention, a network device enabled to communicate over a network link at 1 Gbps or faster may be configured to communicate over the network link at, or approximately at, 100 Mbps by reducing a number of active channels over which the network device communicates and/or by reducing a size of a signal constellation utilized by the network device to encode data. The device may communicate according to 1GBASE-T or 10GBASE-T standards. The number of active channels may be reduced to a single bidirectional channel or two unidirectional channels. The signal constellation may be reduced to two or three levels. An exemplary three level constellation may correspond to constellation points +1, 0, and −1 of the 1GBASE-T standard. An exemplary two level constellation may correspond to points +1, 0 of the 10GBASE-T standard. One or more components of the network device may be unnecessary for recovering data when communicating at 100 Mbps and may thus be powered down, or placed into a lower power mode. Exemplary components which may be unnecessary for 100 Mbps communication may comprise a convolutional encoder, a Viterbi encoder, a multiplier in a decision feedback equalizer, a multiplier in a cancellation filter, a low density parity check encoder, and a partial response filter.

Figure 1:
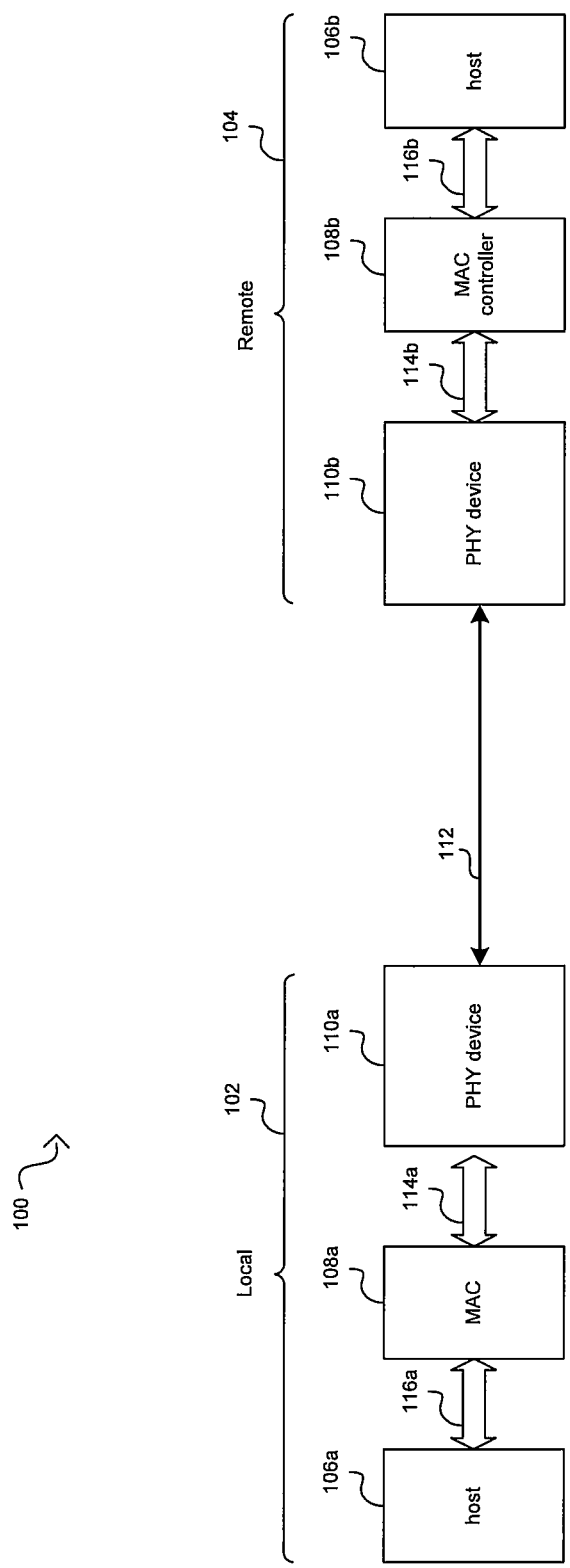
FIG. 1 is a block diagram illustrating an Ethernet connection between two network devices, in accordance with an embodiment of the invention.

FIG. 1 is a block diagram illustrating an Ethernet connection between two network devices, in accordance with an embodiment of the invention. Referring to FIG. 1, there is shown a system 100 that comprises network devices 102 and 104. Notwithstanding the embodiment depicted in FIG. 1, aspects of the invention may be utilized in networks of any size, topology, and/or technology. The local devices 102 and 104 may communicate via a cable 112. The cable 112 may comprise up to four or more physical channels, each of which may, for example, comprise an unshielded twisted pair (UTP). The devices 102 and 104 may communicate via two or more physical channels comprising the cable 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP. In this regard, however, aspects of the invention may enable varying the number of physical channels via which data is communicated.

In an exemplary embodiment of the invention, the devices 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, the devices 102 and/or 104 may comprise a backplane PHY capable of operating at one or more standard rates such as 10Gbps (10BASE-KX4 and/or 10GBASE-KR); and/or non-standard rates such as 2.5 Gbps and 5 Gbps.

In an exemplary embodiment of the invention, the devices 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the link partners, the link partners 102 and/or 104 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the link partners 102 and/or 104.

The device 102 may comprise a host 106a, a medium access control (MAC) controller 108a, and a PHY device 104a. The device 104 may comprise a host 106b, a MAC controller 108b, and a PHY device 110b. Notwithstanding, the invention is not limited in this regard. In various embodiments of the invention, the device 102 and/or 104 may comprise, for example, networking devices such as personal computers, handheld devices, servers, switches, routers, and bridges. In various embodiments of the invention, the device 102 and/or 104 may comprise, for example, computer systems or audio/video (A/V) enabled equipment. In this regard, A/V equipment may, for example, comprise, a microphone, an instrument, a sound board, a sound card, a video camera, a media player, a graphics card, or other audio and/or video device. Additionally, the devices 102 and 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the device 102 and the device 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the device 102 and the device 104 by utilizing a link discovery signaling (LDS) operation that enables detection of active operations in the other device. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high (er) data rate in one direction and transmission and/or reception at a low(er) data rate in the other direction. For example, the device 102 may comprise a multimedia server and the device 104 may comprise a multimedia client. In this regard, the device 102 may transmit multimedia data, for example, to the device 104 at high(er) data rates while the device 104 may transmit control or auxiliary data associated with the multimedia content at low(er) data rates.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example.

In an exemplary embodiment of the invention illustrated in FIG. 1, the hosts 106a and 106b may represent layer 3 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as Physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the device 102. Similarly, the MAC controller 108b may comprise suitable logic, circuitry, and/or code that may enable handling of layer 2 operability and/or functionality in the device 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate capable interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of physical channels at a fixed data rate which may result in network links being underutilized and transmitting IDLE symbols for significant portions of time. In this regard, when the devices 102 and 104 first establish a connection, they may exchange some preliminary information and/or training signals. In this regard, the devices 102 and 104 may negotiate a data rate (e.g., 10 Gbps) and duplex mode (e.g., full-duplex) for communicating with each other. Additionally, in order to establish reliable communications, each of the devices 102 and 104 may need to "train" or adjust various parameters and/or circuitry in a device to account for variables such as the type of cabling over which data is being communicated and the environmental conditions (e.g. temperature) surrounding the cabling. Once the devices are "trained", they may initially transmit data at 1 Gbps, for example. In this regard, conventional PHY devices may distribute traffic evenly over all available physical channels and may continuously transmit IDLE symbols between packets of actual data. However, based, for example, on link utilization, past or present traffic statistics, and/or available resources (e.g., power, buffer space, processor time, etc.), it may be determined that 1 Gbps may be higher than necessary or desired. Accordingly, controlling the data rate of the connection between the devices 102 and 104 may enable the devices 102 and 104 to communicate in a more energy efficient manner. Moreover, while the data rate on the link 112 may be low(er), higher layer functions and/or resources, such as portions of the MAC controller, may be placed into a low(er) power mode. In this regard, the data rate may be reduced to, for example, 100 Mbps by controlling a number of channels utilized to communicate data, controlling the signal constellation utilized for representing data on the link, and controlling a rate at which data is clocked in and/or out of a PHY. In this manner, aspects of the invention may enable network designers and/or administrators to utilize a 1 Gbps PHY or a 10 Gbps PHY to communicate at 100 Mbps, within a tolerance, in a more energy efficient manner than a conventional 100 Mbps PHY. The tolerance, or acceptable deviation of the data rate from 100 Mbps, may be as defined, for example, in the 100BASE-T specification.

In various embodiments of the invention, a data rate of a network link may be controlled to meet demands on the link, and this may result in a fixed data rate which may effectively reduce or eliminate issues associated with links transporting bursty traffic. For example, controlling and/or determining traffic attributes (e.g., inter-frame gap times and network latencies) and/or network resources (e.g., buffer capacity and utilization) may be simplified when dealing with fixed rate traffic. Moreover, certain traffic types, such as video and audio streams, may inherently be of a fixed data rate and may thus lend themselves to efficient transmission over a link utilizing a fixed data rate.

Figure 2:
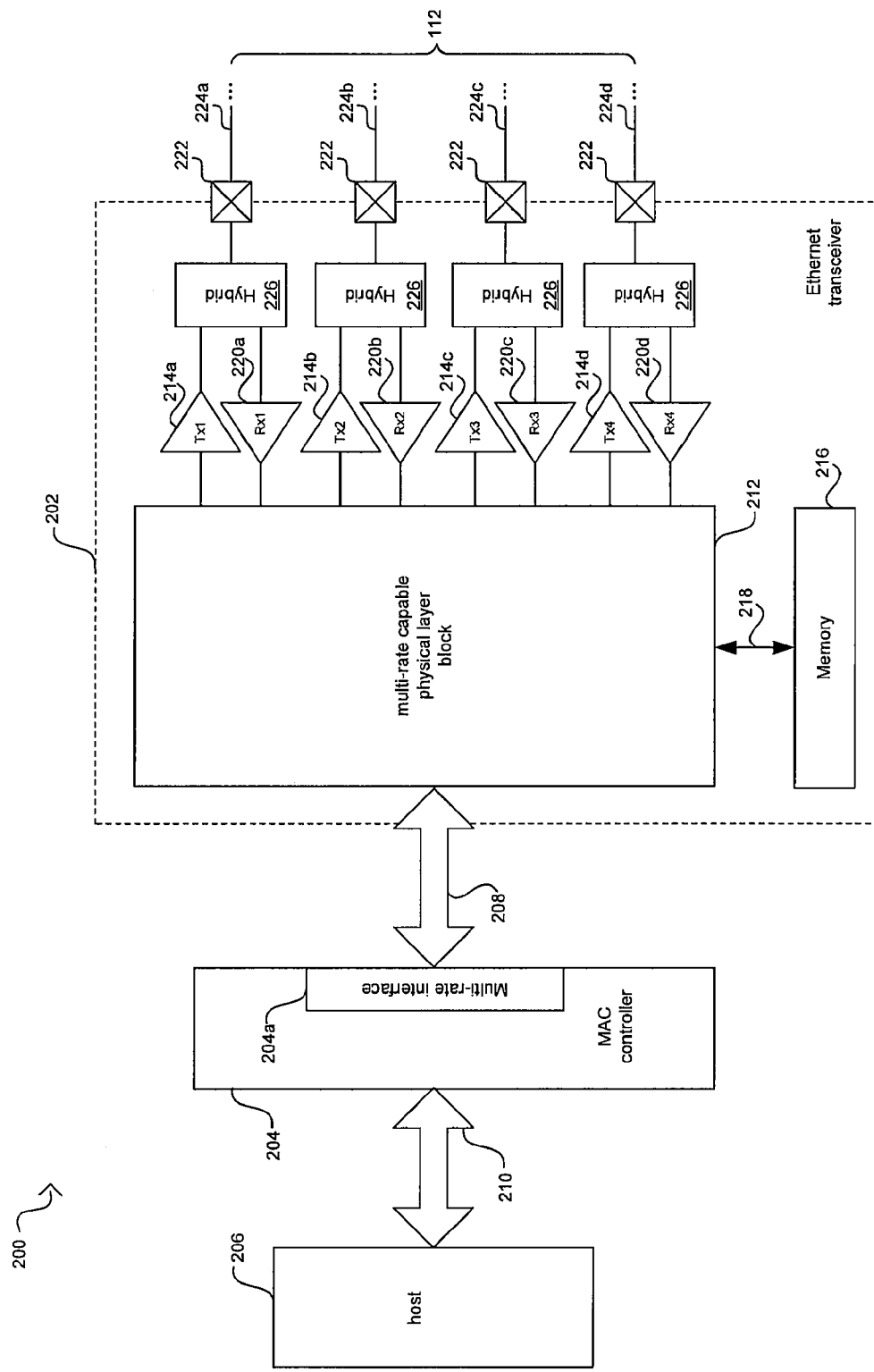
FIG. 2 is a block diagram illustrating an exemplary Ethernet over twisted pair PHY device architecture comprising a multi-rate capable physical block, in accordance with an embodiment of the invention.

FIG. 2 is a block diagram illustrating an exemplary Ethernet over twisted pair PHY device architecture comprising a multi-rate capable physical block, in accordance with an embodiment of the invention. Referring to FIG. 2, there is shown a network device 200 which may comprises an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that comprises a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate capable interface 204a that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating the appropriate link discovery signaling utilized for establishing communication with a remote PHY device in a remote network device. The multi-rate capable physical layer block 212 may communicate with the MAC controller 204 via the interface 208. In one aspect of the invention, the interface 208 may be a media independent interface (MII) and may be configured to utilize a plurality of serial data lanes for receiving data from the multi-rate capable physical layer block 212 and/or for transmitting data to the multi-rate capable physical layer block 212. The multi-rate capable physical layer block 212 may be configured to operate in one or more of a plurality of communication modes, where each communication mode may implement a different communication protocol. These communication modes may include, but are not limited to, Ethernet over twisted pair standards 10BASE-T, 100BASE-TX, 1000BASE-T, 10GBASE-T, and other similar protocols that utilize multiple physical channels between network devices. The multi-rate capable physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214a, 214b, 214c, 214d may comprise suitable logic, circuitry, and/or code that may enable transmission of data from the device 200 to a remote device via, for example, the cable 112 in FIG. 1. The receivers 220a, 220b, 220c, 220d may comprise suitable logic, circuitry, and/or code that may enable receiving data from a remote device. Each of the transmitters 214a, 214b, 214c, 214d and receivers 220a, 220b, 220c, 220d in the PHY device 202 may correspond to a physical channel that may comprise the cable 112. In this manner, a transmitter/receiver pair may interface with each of the physical channels 224a, 224b, 224c, 224d. In this regard, the transmitter/receiver pairs may be enabled to provide the appropriate communication rate and mode for each physical channel.

The input/output interfaces 222 may comprise suitable logic circuitry, and/or code that may enable the PHY device 202 to impress signal information onto a physical channel, for example a twisted pair of the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium of the physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the device 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancellers, far-end crosstalk (FEXT) cancellers, and/or near-end crostalk (NEXT) cancellers. Each hybrid 226 in the device 300 may be communicatively coupled to an input/output interface 222.

In operation, the device 200 may communicate with a remote partner via the cable 112. For example, for 10 Gbps Ethernet, the device 200 may transmit data to and receive data from a remote partner via the physical channels 224a, 224b, 224c, and 224d. In this regard, when there is no data for the device 200 to transmit, then it may transmit IDLE symbols to keep itself and/or the remote partner "trained". In this manner, power consumption of a network may be largely independent of the amount of actual data being transmitted over the network. Accordingly, controlling the data rate over the cable 112 may enable the device 200 to transmit fewer IDLE symbols and thus communicate in a more energy efficient manner.

In an exemplary embodiment of the invention, the system 200 may be enabled to communicate via the link 112 in adherence to 1GBASE-T standards. In instances that it may be desired to communicate data at 100 Mbps, aspects of the invention may enable communicating over the channel 224a and powering down, or placing into a low(er) power state, the remaining channels 224b, 224c, and 224d. Additionally, aspects of the invention may enable utilizing PAM-3 signaling instead of the PAM-5 signaling utilized in the 1GBASE-T standard. In this manner, PAM-3 signaling, as implemented by the system 200 in accordance with an embodiment of the invention, may result in smaller voltage swings on the channel 224a than the MLT-3 encoding utilized in the 100BASE-T standard. In this regard, the lower voltage swings may correlate to less power consumed in the link 112 and in the PHY devices generating and receiving the signals.

Additionally, when operating at 100 Mbps, various portions of a 1GBASE-T PHY may be powered down or placed into a lower power state. For example, one or more of a convolutional encoder, a Viterbi encoder, a multiplier in a decision feedback equalizer, a multiplier in a cancellation filter, and a partial response filters may be powered down or disabled.

In another exemplary embodiment of the invention, the system 200 may be enabled to communicate via the link 112 in adherence to 10GBASE-T standards. In instances that it may be desired to communicate data at 100 Mbps, aspects of the invention may enable communicating over the channel 224a and powering down, or placing into a low(er) power state, the remaining channels 224b, 224c, and 224d. Additionally, aspects of the invention may enable utilizing PAM-2 signaling instead of the PAM-5 signaling utilized in the 1GBASE-T standard. In this manner, PAM-2 signaling, as implemented by the system 200 in accordance with an embodiment of the invention, may result in smaller voltage swings on the channel 224a than the MLT-3 encoding utilized in the 100BASE-T standard. In this regard, the lower voltage swings may correlate to less power consumed in the link 112 and in the PHY devices generating and receiving the signals.

Additionally, when operating at 100 Mbps, various portions of a 1GBASE-T PHY may be powered down or placed into a lower power state. For example, one or more of a low density parity check encoder and/or decoder, a multiplier in a decision feedback equalizer, a multiplier in a cancellation filter, and a partial response filter may be powered down or disabled.

In another exemplary embodiment of the invention, the system 200 may be enabled to communicate via the link 112 in adherence to Ethernet over Backplane standards such as 10GBASE-KX4 and/or 10GBASE-KR. In instances that it may be desired to communicate data at 100 Mbps, aspects of the invention may enable slowing down the rate at which data is clocked into or out of the PHY. In this regard, a transmit and/or receive clock generated in the PHY may be divided by 100 before being provided to the MAC. Dividing a clock utilized for 10 Gbps by a factor of 100 to achieve a clock suitable for 100 Mbps is utilized for illustration; however, the invention is not so limited. In this regard, clocks of backplane PHYs which utilize other standard rates such as 1 Gbps or non-standard rates such as 2.5 Gbps and 40 Gbps may be divided down to reduce the rate at which data is clocked in and/or out.

In another exemplary embodiment of the invention, the system 200 may be enabled to communicate via the link 112 in adherence to Ethernet over optical media standards such as 10GBASE-LR, 10GBASE-SR, 10GBASE-LRM, 10GBASE-LX4. In instances that it may be desired to communicate data at 100 Mbps, aspects of the invention may enable slowing down the rate at which data is clocked into or out of the PHY. In this regard, a transmit and/or receive clock generated in the PHY may be divided by 100 before being provided to the MAC. Dividing clock utilized for 10 Gbps by 100 to achieve a clock suitable for 100 Mbps is utilized for illustration; however, the invention is not so limited. In this regard, clocks of optical PHYs which utilize other standard rates such as 1 Gbps or non-standard rates such as 2.5 Gbps and 40 Gbps may be divided down to reduce the rate at which data is clocked in and/or out.

Figure 3A:
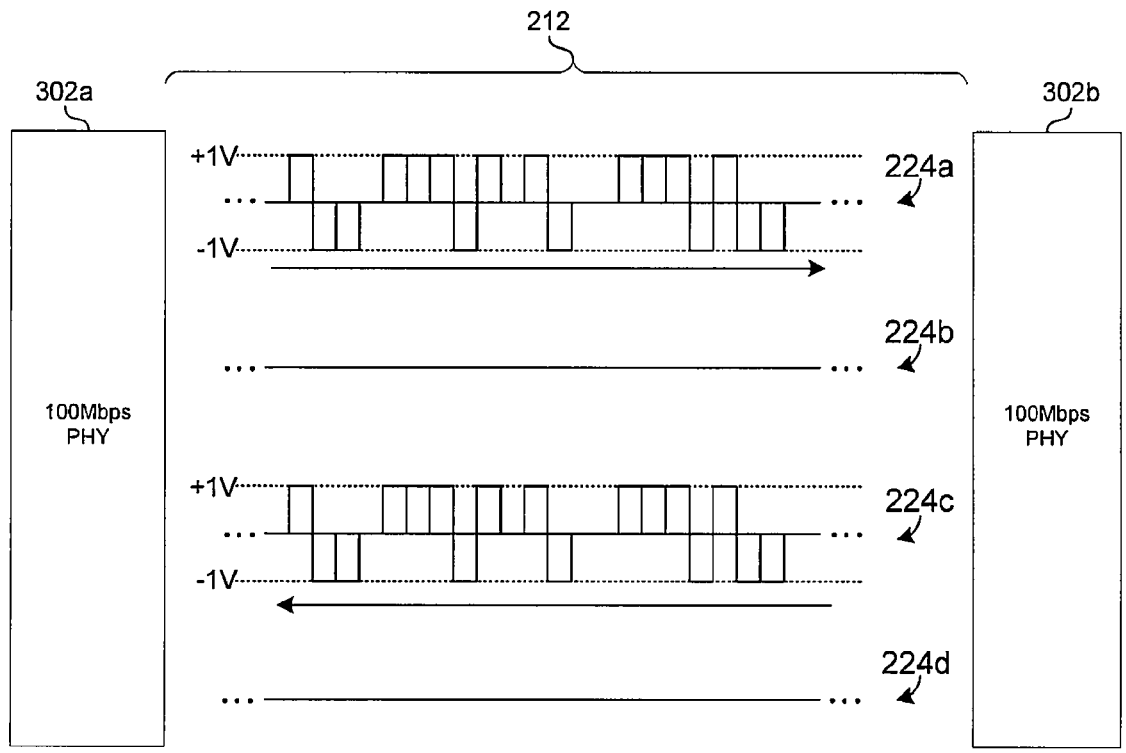
FIG. 3A illustrates a conventional 100BASE-T PHY, in connection with an embodiment of the invention.

FIG. 3A illustrates a conventional 100BASE-T PHY, in connection with an embodiment of the invention. Referring to FIG. 3A, there is shown two 100BASE-T PHY devices 302a and 302b communicating, in accordance with 100BASE-T standards, over link 112 comprising channels 224a, 224b, 224c, and 224d.

The PHY devices 302a and 302b may comprise suitable logic, circuitry, and/or code that enables communication in accordance with 100BASE-T standards. In this regard, 100BASE-T communications may be half-duplex, and thus channel 224a may convey data from the PHY 302a to the PHY 302b, while channel 224c may convey data from the PHY 302b to the PHY 302a. In 100BASE-T communications, each four data bits may be mapped to five bit blocks via 4B/5B encoding and each bit of each five bit block may be encoded utilizing MLT-3 encoding. In this regard, symbols $\{+1, 0, \text{ and } -1\}$ may map to voltages $\{+1V, 0V, \text{ and } -1V\}$ for signaling on a channel. Symbols may be transmitted onto the channels 224a and 224 at 125 mega symbols per second (125 Msps). In this manner, a maximum data rate of 100 Mbps may be achieved on each of the channels 224a and 224c.

Figure 3B:
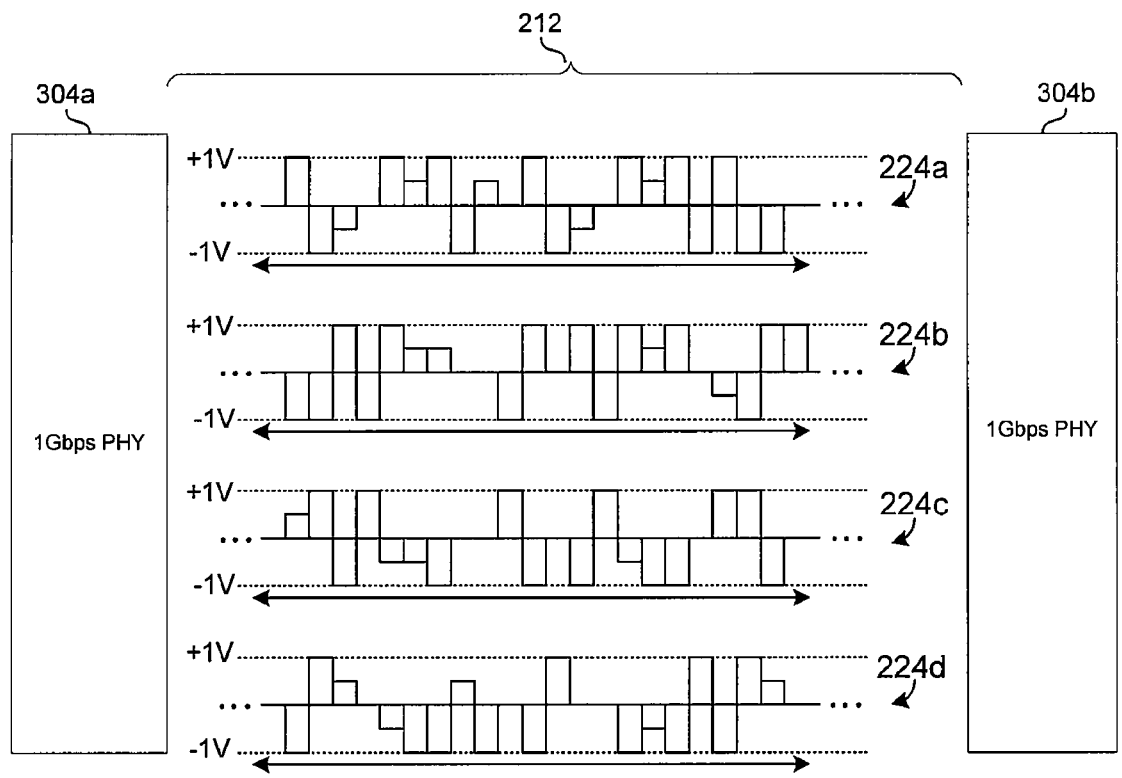
FIG. 3B illustrates a conventional 1GBASE-T PHY, in connection with an embodiment of the invention.

FIG. 3B illustrates a conventional 1GBASE-T PHY, in connection with an embodiment of the invention. Referring to FIG. 3B, there is shown two PHY devices 304a and 304b communicating, in accordance with 1GBASE-T standards, over link 112 comprising channels 224a, 224b, 224c, and 224d.

The PHY devices 304a and 304b may comprise suitable logic, circuitry, and/or code that enables communication in accordance with 1GBASE-T standards. In this regard, 1GBASE-T communications may be full-duplex, and thus channels 224a, 224b, 224c, and 224d may each convey data bi-directionally. In 1GBASE-T communications, PAM-5 encoding may enable representing two bits of data with each symbol. In this regard, symbols $\{+2, +1, 0, -1, -2\}$ may map to voltages $\{+1V, +0.5V, 0V, -0.5V, \text{ and } -1V\}$ for signaling on a channel. The symbols may be transmitted onto each of the channels 224a, 224b, 224c, and 224d at 125 Msps resulting in a data rate of 250 Mbps in each direction on each channel.

Figure 3C:
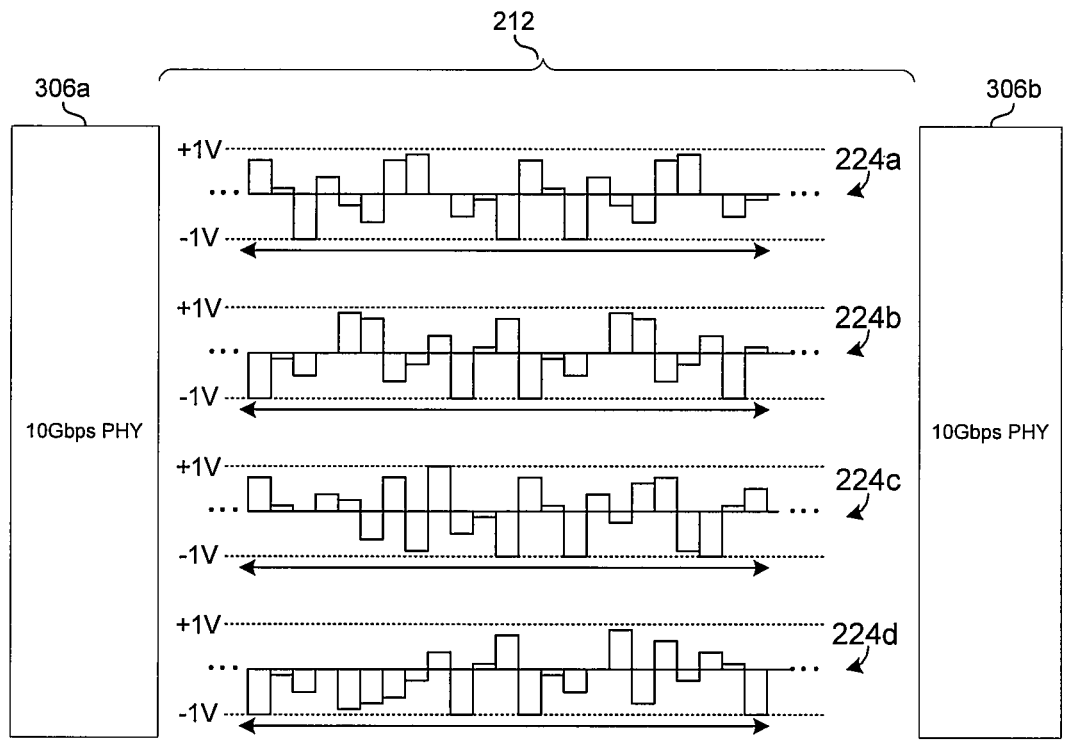
FIG. 3C illustrates a conventional 10GBASE-T PHY, in connection with an embodiment of the invention.

FIG. 3C illustrates a conventional 10GBASE-T PHY, in connection with an embodiment of the invention. Referring to FIG. 3B, there is shown two PHY devices 306a and 306b communicating, in accordance with 10GBASE-T standards, over link 112 comprising channels 224a, 224b, 224c, and 224d.

The PHY devices 306a and 306b may comprise suitable logic, circuitry, and/or code that enables communication in accordance with 10GBASE-T standards. In this regard, 10GBASE-T communications may be full-duplex, and thus channels 224a, 224b, 224c, and 224d may each convey data bi-directionally. In 10GBASE-T communications, PAM-16 encoding may enable representing 3.125 bits of data with each symbol. In this regard, symbols may map to voltages of $\{-1V, -0.87V, -0.74V, \ldots, +0.87V, +1V\}$ for signaling on a channel. The symbols may be transmitted onto each of the channels 224a, 224b, 224c, and 224d at 833 Msps resulting in a data rate of 2500 Mbps in each direction on each channel.

Figure 4A:
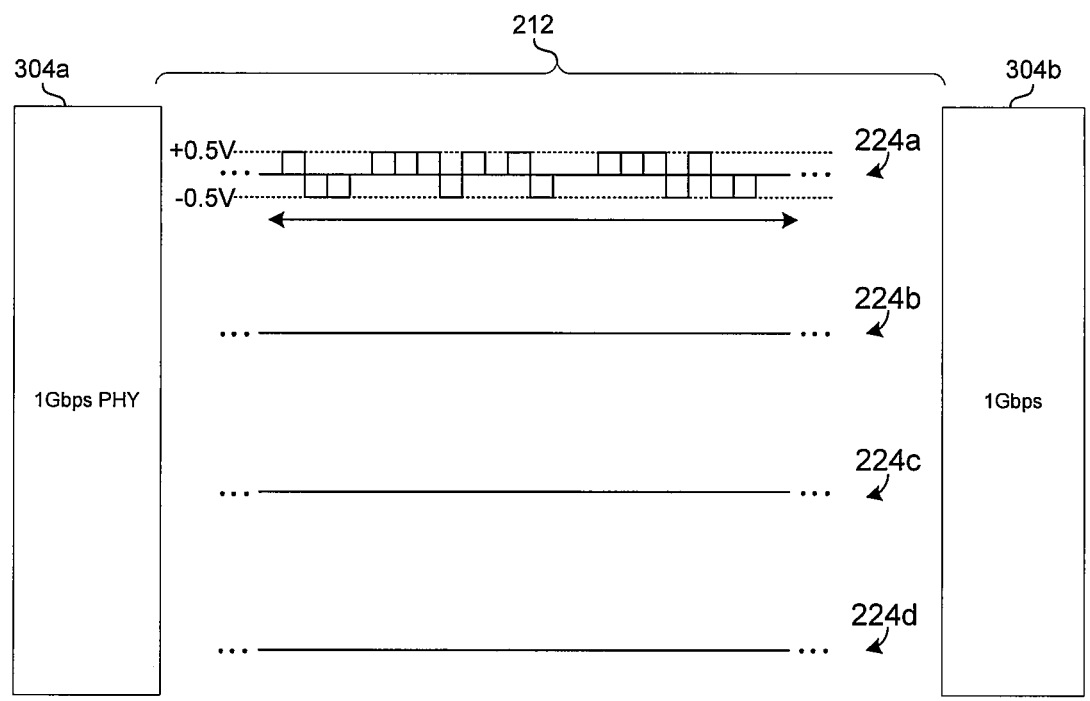
FIG. 4A illustrates a 1GBASE-T PHY device enabled to communicate at 100 Mbps over a duplex channel, in accordance with an embodiment of the invention.

FIG. 4A illustrates a 1GBASE-T PHY device enabled to communicate at 100 Mbps over a duplex channel, in accordance with an embodiment of the invention. Referring to FIG. 4A, there is shown two PHY devices 304a and 304b communicating at 100 Mbps over the link 112 comprising channels 224a, 224b, 224c, and 224d.

The PHY devices 304a and 304b may be similar to or the same as the PHY device 202 described with respect to FIG. 2. Each of the PHY devices 304a and 304b may comprise suitable logic, circuitry, and/or code that may enable communicating at speeds of 100 Mbps in a more energy efficient manner than the 100BASE-T standard. In this regard, data may be communicated bi-directionally on channel 224a while channels 224b, 224c, and 224d, and circuitry associated therewith, may be powered down or in a low(er) power state. In the embodiment of the invention depicted in FIG. 4A, each four data bits may be mapped to five bit blocks via 4B/5B encoding and each bit of each five bit blocks may be encoded utilizing PAM-3 encoding. In this regard, symbols $\{+1, 0, \text{ and } -1\}$ may map to voltages $\{+0.5V, 0V, \text{ and } -0.5V\}$ for signaling on a channel. Symbols may be transmitted at 125 Msps in each direction onto the channels 224a. In this manner, a maximum data rate of 100 Mbps in each direction may be achieved on the channel 224a. Accordingly, energy efficiency may be improved due to lower voltages on the channel 224a and due to powering down, or placing into a low(er) power state, circuitry associated with the channels 224b, 224c, and 224d.

Figure 4B:
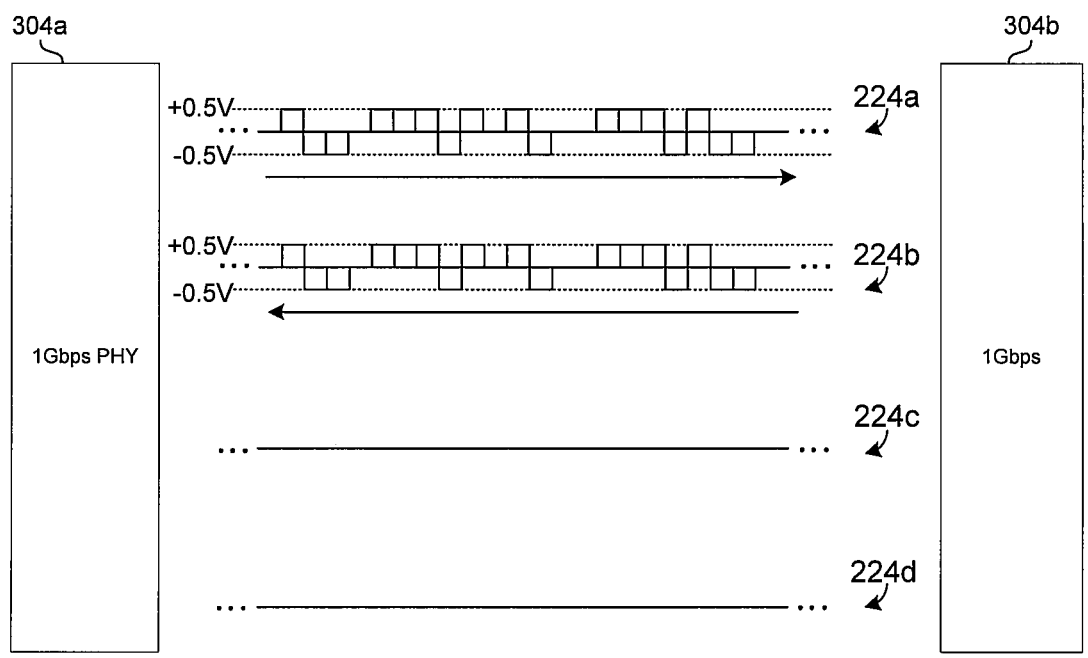
FIG. 4B illustrates a 1GBASE-T PHY device enabled to communicate at 100 Mbps over two simplex channels, in accordance with an embodiment of the invention.

FIG. 4B illustrates a 1GBASE-T PHY device enabled to communicate at 100 Mbps over two simplex channels, in accordance with an embodiment of the invention. Referring to FIG. 4B, there is shown two PHY devices 304a and 304b communicating at 100 Mbps over the link 112 comprising channels 224a, 224b, 224c, and 224d.

The PHY devices 304a and 304b may be similar to or the same as the PHY device 202 described with respect to FIG. 2. Each of the PHY devices 304a and 304b may comprise suitable logic, circuitry, and/or code that may enable communicating at speeds of 100 Mbps in a more energy efficient manner than the 100BASE-T standard. In this regard, data may be communicated uni-directionally on each of the channels 224a and 224b while channels 224c and 224d, and circuitry associated therewith, may be powered down or in a low(er) power state. Furthermore, various portions of circuitry associated with the channels 224a and 224b which may not be necessary for unidirectional communication may be powered down. In the embodiment of the invention depicted in FIG. 4B, each four data bits may be mapped to five bit blocks via 4B/5B encoding and each bit of each five bit blocks may be encoded utilizing PAM-2 encoding. In this regard, symbols $\{+1 \text{ and } 0\}$ may map to voltages $\{+0.5V, \text{ and } 0V\}$ for signaling on a channel. Symbols may be transmitted at 125 Msps in one direction over the channels 224a and in the other direction over the channel 224b. In this manner, a maximum data rate of 100 Mbps in each direction may be achieved on the channel 224a. Accordingly, energy efficiency may be improved due to lower voltages on the channel 224a and due to powering down, or placing into a low(er) power state, circuitry associated with the channels.

Figure 5A:
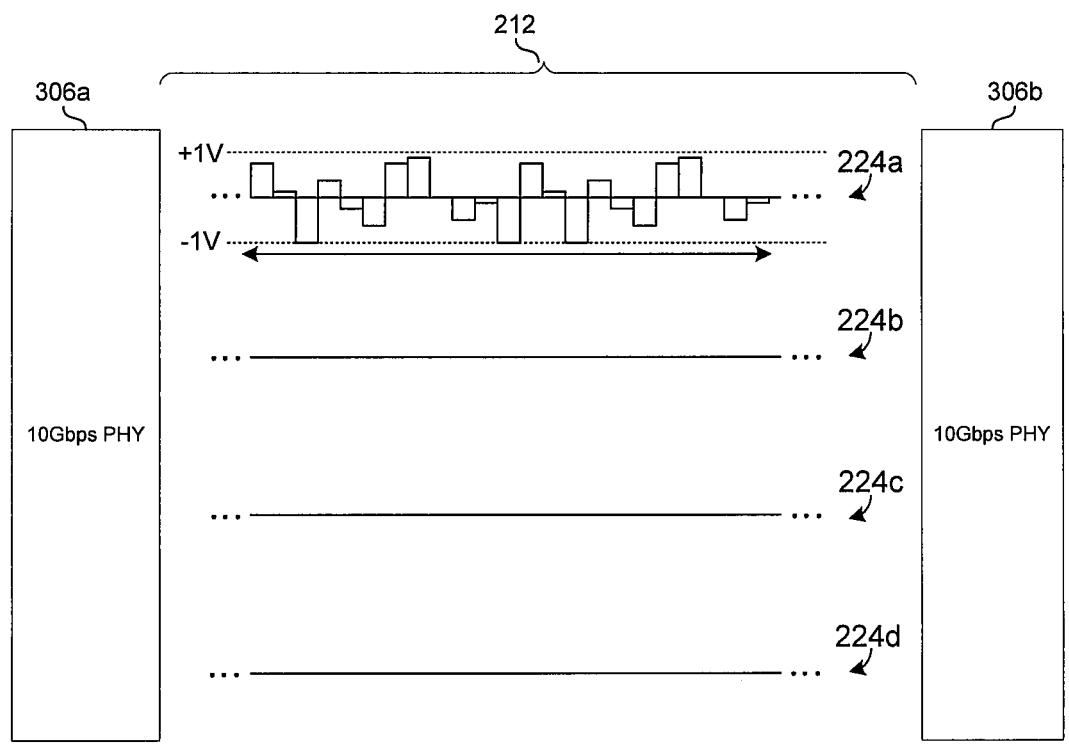
FIG. 5A illustrates a 10GBASE-T PHY device enabled to communicate at 100 Mbps over a duplex channel, in accordance with an embodiment of the invention.

FIG. 5A illustrates a 10GBASE-T PHY device enabled to communicate at 100 Mbps over a duplex channel, in accordance with an embodiment of the invention. Referring to FIG.

5A, there is shown two PHY devices 306a and 306b communicating at 100 Mbps over the link 112 comprising channels 224a, 224b, 224c, and 224d.

The PHY devices 306a and 306b may be similar to or the same as the PHY device 202 described with respect to FIG. 2. Each of the PHY devices 306a and 306b may comprise suitable logic, circuitry, and/or code that may enable communicating at speeds of 100 Mbps in a more energy efficient manner than the 100BASE-T standard. In this regard, data may be communicated bi-directionally on channel 224a while channels 224b, 224c, and 224d, and circuitry associated therewith, may be powered down or in a low(er) power state. In the embodiment of the invention depicted in FIG. 5A, may be encoded utilizing PAM-2 encoding. In this regard, symbols {+1 and 0} may map to voltages {+0.5V and 0V} for signaling on a channel. Symbols may be transmitted at 833 Msps in one direction over the channel 224a and in the other direction over the channel 224b. In this manner, a maximum data rate of 100 Mbps in each direction may be achieved on the channel 224a. Accordingly, energy efficiency may be improved due to lower voltages on the channel 224a and due to powering down, or placing into a low(er) power state, circuitry associated with the channels 224b, 224c, and 224d.

Figure 5B:
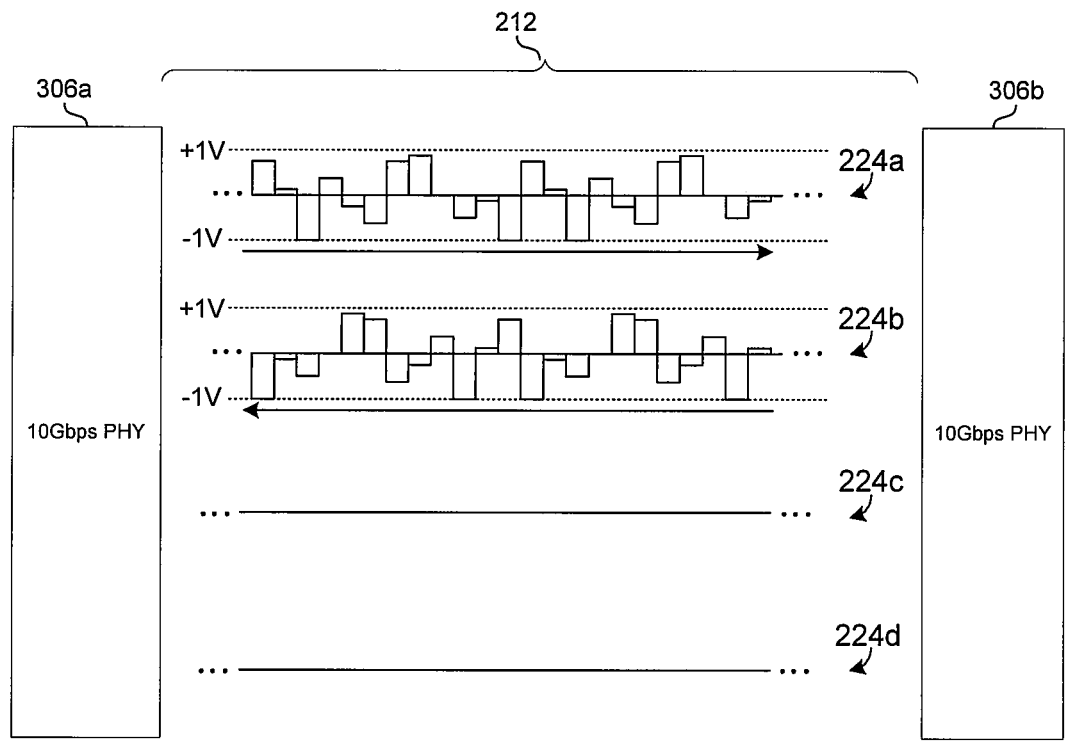
FIG. 5B illustrates a 10GBASE-T PHY device enabled to communicate at 100 Mbps over two simplex channels, in accordance with an embodiment of the invention.

FIG. 5B illustrates a 10GBASE-T PHY device enabled to communicate at 100 Mbps over two simplex channels, in accordance with an embodiment of the invention. Referring to FIG. 5B, there is shown two PHY devices 200a and 200b communicating at 100 Mbps over the link 112 comprising channels 224a, 224b, 224c, and 224d.

The PHY devices 202a and 202b may be similar to or the same as the PHY device 202 described with respect to FIG. 2. Each of the PHY devices 202a and 202b may comprise suitable logic, circuitry, and/or code that may enable communicating at speeds of 100 Mbps in a more energy efficient manner than the 100BASE-T standard. In this regard, data may be communicated uni-directionally on each of the channels 224a and 224b while channels 224c and 224d, and circuitry associated therewith, may be powered down or in a low(er) power state. Furthermore, various portions of circuitry associated with the channels 224a and 224b which may not be necessary for uni-directional communication may be powered down. In the embodiment of the invention depicted in FIG. 5B, data may be encoded utilizing PAM-2 encoding. In this regard, symbols {+1 and 0} may map to voltages {+0.5V and 0V} for signaling on a channel. Symbols may be transmitted at 833 Msps in each direction onto the channels 224a. In this manner, a maximum data rate of 100 Mbps in each direction may be achieved on the channel 224a. Accordingly, energy efficiency may be improved due to lower voltages on the channel 224a and due to powering down, or placing into a low(er) power state, circuitry associated with the channels.

Exemplary aspects of a method and system for energy efficient signaling for 100 mbps Ethernet using a subset are provided. In an exemplary embodiment of the invention, a network device 200 enabled to communicate over a network link 112 at 1 Gbps or faster may be configured to communicate over the network link 112 at, or approximately at, 100 Mbps by reducing a number of active channels 224 over which the network device 200 communicates and/or by reducing a size of a signal constellation utilized by the network device to encode data. The device 200 may communicate according to 1GBASE-T or 10GBASE-T standards. The number of active channels 224 may be reduced to a single bidirectional channel as in FIGS. 4A and 5A or two unidirectional channels as in FIGS. 4B and 5B. The signal constellation may be reduced to two or three levels. An exemplary three level constellation may correspond to constellation points +1, 0, and −1 of the 1GBASE-T standard. An exemplary two level constellation may correspond to points +1, 0 of the 10GBASE-T standard. One or more components of the network device 200 may be unnecessary for recovering data when communicating at 100 Mbps and may thus be powered down, or placed into a lower power mode. Exemplary components which may be unnecessary for 100 Mbps communication may comprise a convolutional encoder, a Viterbi encoder, a multiplier in a decision feedback equalizer, a multiplier in a cancellation filter, a low density parity check encoder, and a partial response filter.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for energy efficient signaling for 100 mbps Ethernet using a subset technique.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
configuring an Ethernet PHY to communicate over a twisted-pair network link in compliance with 1GBASE-T or 10GBASE-T standards based on a successful completion of an autonegotiation process between said Ethernet PHY and a link partner;
after said configuration, communicating by said Ethernet PHY with said link partner using four twisted pairs in said twisted-pair network link; and
reducing, in response to a low link utilization condition, a number of twisted pairs of said twisted-pair network link over which said Ethernet PHY communicates with said link partner to less than four and reducing a size of a signal constellation utilized by said Ethernet PHY to encode data, said reduced signal constellation being a subset of a signal constellation used by said Ethernet PHY when communicating using four twisted pairs, such that said Ethernet PHY communicates at, 100 Mbps.

2. The method according to claim 1, wherein said reducing comprises reducing said number of twisted pairs to two, wherein each twisted pair communicates data unidirectionally.

3. The method according to claim 1, wherein said reducing comprises reducing said number of twisted pairs to one, wherein said one twisted pair communicates data bidirectionally.

4. The method according to claim 1, wherein said reducing a size of a signal constellation comprises reducing said size of said signal constellation to three levels, wherein said three levels correspond to constellation points +1, 0, and −1 of the 1GBASE-T standard.

5. The method according to claim 1, wherein said reducing a size of a signal constellation comprises reducing said size of said signal constellations to two levels.

6. The method according to claim 5, wherein said two levels correspond to constellation points +1, 0 of the 10GBASE-T standard.

7. The method according to claim 1, further comprising powering down, or placing into a lower power mode, one or more components of said Ethernet PHY that are unnecessary for recovering data when communicating at 100 Mbps.

8. The method according to claim 7, wherein said components comprise one or more of a convolutional encoder, a Viterbi encoder, a multiplier in a decision feedback equalizer, a multiplier in a cancellation filter, a low density parity check encoder, and a partial response filter.

9. The method according to claim 1, wherein said reducing occurs without performance of a second autonegotiation process.

10. A system for networking, the method comprising:
one or more circuits for use in an Ethernet PHY, said one or more circuits being configured to:
configure an Ethernet PHY to communicate over a twisted-pair network link in accordance with a first signal constellation defined by one of 1GBASE-T or 10GBASE-T based on a successful completion of an autonegotiation process between said Ethernet PHY and a link partner;
after said configuration, communicate by said Ethernet PHY with said link partner using four twisted pairs in said twisted-pair network link; and
reduce, in response to a low link utilization condition, a number of twisted pairs of said twisted-pair network link over which said Ethernet PHY communicates with said link partner to less than four such that said Ethernet PHY communicates at, or approximately at, 100 Mbps using a second signal constellation that is produced by reducing a size of said first signal constellation, said second signal constellation being a subset of said first signal constellation.

11. The system according to claim 10, wherein said one or more circuits are configured to reduce said number of twisted pairs to two, wherein each twisted pair communicates data unidirectionally.

12. The system according to claim 10, wherein said one or more circuits are configured to reduce said number of twisted pairs to one, wherein said one twisted pair communicates data bidirectionally.

13. The system according to claim 10, wherein said second signal constellation consists of constellation points +1, 0, and −1 of 1GBASE-T.

14. The system according to claim 10, wherein said second signal constellation has two levels.

15. The system according to claim 14, wherein said two levels correspond to constellation points +1, 0 of the 10GBASE-T standard.

16. The system according to claim 10, wherein said one or more circuits are configured to power down, or place into a lower power mode, one or more components of said Ethernet PHY that are unnecessary for recovering data when communicating at 100 Mbps.

17. The system according to claim 16, wherein said components comprise one or more of a convolutional encoder, a Viterbi encoder, a multiplier in a decision feedback equalizer, a multiplier in a cancellation filter, a low density parity check encoder, and a partial response filter.

18. The system according to claim 10, wherein said reduction occurs without performance of a second autonegotiation process.

19. A method for networking, the method comprising:
configuring an Ethernet PHY to communicate at a first link rate over four twisted pairs in accordance with a defined first signal constellation based on a successful completion of an autonegotiation process between said Ethernet PHY and a link partner; and
reconfiguring, without a further autonegotiation process, said Ethernet PHY in response to a low link utilization condition, said reconfiguration enabling said Ethernet PHY to communicate at a second link rate lower than said first link rate using less than four twisted pairs and a second signal constellation that is produced by reducing a size of said first signal constellation, said second signal constellation being a subset of said first signal constellation.

20. The method of claim 19, wherein said first signal constellation is defined by 1GBASE-T.

21. The method of claim 19, wherein said first signal constellation is defined by 10GBASE-T.

* * * * *